Patented Sept. 2, 1941

2,254,471

UNITED STATES PATENT OFFICE 2,254,471

PROTECTIVE COMPOSITION

Domenico Cascio, Atlantic Highland, N. J.

No Drawing. Application October 10, 1939,
Serial No. 298,850

11 Claims. (Cl. 106—15)

This invention relates to coating compositions and, more particularly, to liquid coating compositions intended primarily for fire-proofing and fire-retarding and water-proofing purposes.

Sodium silicate is an excellent vehicle for fire-resistant paints but its use is restricted by reason of certain of its properties which make its use undesirable or unsuitable for certain purposes. The properties of sodium silicate which limit the use thereof as a vehicle for a fire-resistant paint are due to the fact that sodium silicate has a high sodium hydroxide (NaOH) content. By reason of this relatively high sodium hydroxide content, sodium silicate is very soluble in water, is very hygroscopic, is capable of efflorescence with formation of sodium carbonate ($Na_2CO_3$), and forms soaps with fats so that the paint does not adhere to an oil painted surface. As sodium silicate is very soluble in water and is hygroscopic, it is of course unsuitable for water-proofing purposes.

In accordance with the present invention, the sodium hydroxide content of the sodium silicate is chemically eliminated or reduced to the desired extent whereby to produce a liquid coating composition or paint which is resistant to both fire and water, which is capable of adhering practically to any surface and which is further characterized by long life and durability. The coating composition or paint produced in accordance with the present invention is furthermore characterized by absence of film formation or "livering" in the containers thereof, and the composition is simple to use and to apply and is non-dangerous.

For eliminating or reducing the sodium hydroxide content of sodium silicate ($2NaOH.3SiO_2$)

I treat it with pyroantimonic acid ($H_4Sb_2O_7$). As a result of this treatment, the pyroantimonic acid combines with the sodium hydroxide of the sodium silicate forming a new product which may be designated as "sodium pyroantimonate silicate" having the chemical formula $Na_2H_2Sb_2O_7.3SiO_2$ The reaction takes place as indicated by the following equation:

$2NaOH.3SiO_2 + H_4Sb_2O_7 =$
$Na_2H_2Sb_2O_7.3SiO_2 + 2H_2O$

The new product is herein referred to as "sodium pyroantimonate silicate." It is free from all the objections and disadvantages possessed by the sodium silicate before the treatment thereof with pyroantimonic acid in accordance with the present invention.

The sodium pyroantimonate silicate ($Na_2H_2Sb_2O_7.3SiO_2$)

may be prepared as follows. Sodium silicate ($2NaOH.3SiO_2$) in liquid form at 25 Baumé is poured into a colloidal mill, and while said mill is in operation, the pyroantimonic acid ($H_4Sb_2O_7$)

in powder form is added very slowly to the sodium silicate in the mill, the proportion of pyroantimonic acid to the liquid sodium silicate being suggested by the molecular weights of said sodium silicate and pyroantimonic acid. When the reduced alkalinity, tested in any suitable way, as, for example, by a potentiometer, shows that the reaction is complete, pigments, resins, oils, etc. are added to the product in the colloidal mill, depending upon the desired type of paint. It is apparent that the neutralization of the sodium hydroxide of the sodium silicate may be total or partial according to the type of paint that is desired. Further by way of example of the proportion of pyroantimonic acid ($H_4Sb_2O_7$) to sodium silicate ($2NaOH.3SiO_2$), there is preferably utilized 1,000 cc. of sodium silicate at 25 Bé. to which there is added from about 300 to about 350 grams of pyroantimonic acid in powder form, and after the reaction in the colloidal mill, the pigment and/or resin and/or other substance may be added as desired for producing a paint of the desired kind. It will be understood that the pigment, oil, or other added substance is preferably water-insoluble.

The same process can be applied to potassium silicate ($K_2O.2SiO_2$) resulting in the formation of a new product which may be designated as "acid potassium pyroantimonate silicate" having the chemical formula $K_2H_2Sb_2O_7.2SiO_2$. For preparing this product, substantially the same procedure is followed as described above in reference to the production of the sodium pyroantimonate silicate, the pyroantimonic acid in powder form being added to the liquid potassium silicate in a colloidal mill. Preferably, and by way of example of the proportions, about 200 grams of pyroantimonic acid in powder form are added to 1,000 cc. of potassium silicate at 22 Bé. Water insoluble pigment and/or other substances may be added for producing paints of the desired characteristics.

Thus there is produced in accordance with the present invention an inorganic derivative of an alkali-metal silicate, such as sodium silicate or potassium silicate, free from hydroxide and combined with an antimony compound. The products thus produced with or without added pigments, oils, resins, or other substances are particularly useful as protective compositions to be applied for fire prevention or retarding purposes and also for water-proofing purposes. Said composition is capable of adhering practically to any surface to which it is applied and is more durable than the ordinary oil paint. It is further characterized by the absence of film formation ("livering") on the surface thereof in containers therefor, and the composition is easy to apply and is non-dangerous to workmen or others who handle the same.

While I have described the preferred manner of producing the composition of the present invention, it will be understood that the same is susceptible of various alterations and modifications and uses which will occur to skilled artisans particularly in view of the present disclosure. Accordingly, I do not wish to be limited to the invention as herein specifically described except as may be required by the scope of the appended claims.

Having thus described my invention, what I claim and desire to secure by Letters Patent is:

1. As a new product, sodium pyroantimonate silicate.

2. As a new product, potassium pyroantimonate silicate.

3. The method of producing a water-insoluble inorganic derivative of an alkali-metal silicate which comprises treating an alkali-metal silicate of the group consisting of sodium silicate and potassium silicate with pyroantimonic acid.

4. The method of producing a fire-resistant composition which comprises treating in a colloidal mill an alkali-metal silicate of the group consisting of sodium silicate and potassium silicate with pyroantimonic acid.

5. The method of producing a fire-resistant composition which comprises treating an alkali-metal silicate of the group consisting of sodium silicate and potassium silicate with pyroantimonic acid, and incorporating a pigment in the reaction product.

6. A protective composition of the character described comprising a pyroantimonic acid derivative of an alkali-metal silicate of the group consisting of sodium silicate and potassium silicate.

7. A protective composition of the character described comprising a colloidal suspension in water of a pyroantimonic acid derivative of sodium silicate.

8. A protective composition of the character described comprising a colloidal suspension in water of a pyroantimonic acid derivative of potassium silicate.

9. As a new product, a liquid containing a compound of the group consisting of sodium pyroantimonate silicate and potassium pyroantimonate silicate.

10. As a new product, a liquid containing a compound of the group consisting of sodium pyroantimonate silicate and potassium pyroantimonate silicate, and a pigment dispersed in said liquid.

11. The method of producing a fire-resistant composition which comprises treating liquid sodium silicate with pyroantimonic acid in such quantity that the sodium hydroxide content of said sodium silicate is partially neutralized.

DOMENICO CASCIO.